(12) United States Patent
Wang et al.

(10) Patent No.: US 11,630,957 B2
(45) Date of Patent: Apr. 18, 2023

(54) NATURAL LANGUAGE PROCESSING METHOD AND APPARATUS

(71) Applicant: Huawei Technologies Co., Ltd., Shenzhen (CN)

(72) Inventors: Yasheng Wang, Shenzhen (CN); Jiansheng Wei, Shenzhen (CN); Yang Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 285 days.

(21) Appl. No.: 16/807,997

(22) Filed: Mar. 3, 2020

(65) Prior Publication Data
US 2020/0202075 A1    Jun. 25, 2020

Related U.S. Application Data

(63) Continuation of application No. PCT/CN2018/103837, filed on Sep. 3, 2018.

(30) Foreign Application Priority Data

Sep. 4, 2017 (CN) .......................... 201710786457.3

(51) Int. Cl.
G06F 40/30 (2020.01)
G06F 40/242 (2020.01)
G06N 20/00 (2019.01)

(52) U.S. Cl.
CPC ............ G06F 40/30 (2020.01); G06F 40/242 (2020.01); G06N 20/00 (2019.01)

(58) Field of Classification Search
CPC ........ G06F 40/30; G06F 40/242; G06F 16/35; G06F 16/374; G06N 20/00; G06K 9/6256
(Continued)

(56) References Cited

U.S. PATENT DOCUMENTS 8,731,995 B2 * 5/2014 Sun .................... G06Q 30/0201
705/347
10,430,717 B2 * 10/2019 Hashimoto ............ G06N 5/022
(Continued)

FOREIGN PATENT DOCUMENTS

CN           102682124 A      9/2012
CN           103020249 A      4/2013
(Continued)

*Primary Examiner* — Akwasi M Sarpong
(74) *Attorney, Agent, or Firm* — Conley Rose, P.C.

(57) ABSTRACT

A natural language processing method includes obtaining a to-be-processed phrase, where the to-be-processed phrase includes M words, determining polarity characteristic information of m to-be-processed words in the M words, where polarity characteristic information of an $i^{th}$ word in the m to-be-processed words includes n polarity characteristic values, and each polarity characteristic value corresponds to one sentiment polarity, determining a polarity characteristic vector of the to-be-processed phrase based on the polarity characteristic information of the m to-be-processed words, where the polarity characteristic vector includes n groups of components in a one-to-one correspondence with n sentiment polarities, and determining a sentiment polarity of the to-be-processed phrase based on the polarity characteristic vector of the to-be-processed phrase using a preset classifier, and outputting the sentiment polarity.

20 Claims, 5 Drawing Sheets

(58) Field of Classification Search
USPC .......................................................... 704/9
See application file for complete search history.

(56) References Cited

U.S. PATENT DOCUMENTS

| | | | | |
|---|---|---|---|---|
| 2010/0262454 | A1* | 10/2010 | Sommer | G06F 16/355 706/55 |
| 2012/0246054 | A1* | 9/2012 | Sastri | G06Q 50/01 705/37 |
| 2012/0278253 | A1* | 11/2012 | Gahlot | G06Q 30/0201 705/347 |
| 2013/0204882 | A1* | 8/2013 | Blaschak | G06F 40/30 707/751 |
| 2014/0222417 | A1* | 8/2014 | Lu | G10L 15/183 704/9 |
| 2015/0286628 | A1* | 10/2015 | Akamine | G06F 16/313 704/9 |
| 2016/0171386 | A1* | 6/2016 | Brun | G06F 40/211 706/12 |
| 2017/0213138 | A1* | 7/2017 | Bojja | G06N 7/005 |
| 2017/0249389 | A1 | 8/2017 | Brovinsky et al. | |
| 2017/0344880 | A1 | 11/2017 | Nekuii | |
| 2018/0174203 | A1* | 6/2018 | L'Huillier | G06Q 30/0281 |

FOREIGN PATENT DOCUMENTS

| | | |
|---|---|---|
| CN | 103699521 A | 4/2014 |
| CN | 104281694 A | 1/2015 |
| CN | 104794212 A | 7/2015 |
| CN | 103049435 B | 10/2015 |
| CN | 105045819 A | 11/2015 |
| CN | 105045857 A | 11/2015 |
| CN | 105095183 A | 11/2015 |
| CN | 105912720 A | 8/2016 |
| CN | 105930503 A | 9/2016 |
| CN | 103838712 B | 1/2017 |
| CN | 106503049 A | 3/2017 |
| CN | 107077486 A | 8/2017 |
| CN | 107526831 A | 12/2017 |
| JP | 2011204226 A | 10/2011 |

* cited by examiner

NATURAL LANGUAGE PROCESSING METHOD AND APPARATUS

CROSS-REFERENCE TO RELATED APPLICATIONS

This application is a continuation of International Patent Application No. PCT/CN2018/103837, filed on Sep. 3, 2018, which claims priority to Chinese Patent Application No. 201710786457.3 filed on Sep. 4, 2017. The disclosures of the aforementioned applications are hereby incorporated by reference in their entireties.

TECHNICAL FIELD

This application relates to the field of information processing, and more specifically, to a natural language processing method and apparatus.

BACKGROUND

Natural language processing (NLP) is a technology that enables a computer to understand and process a natural human language, and is also an important technical means to implement artificial intelligence. Sentiment analysis (SA) is a branch of natural language processing. A subjective sentiment contained in a text is analyzed, to determine a sentiment polarity, for example, performing a positive or negative determining, or identifying an emotion such as happiness, anger, sadness, or joy expressed in the text.

In a sentiment analysis process of a text, a sentimentally inclined phrase (also referred to as a phrase with a sentiment polarity, a sentiment phrase for short below) in a sentence usually needs to be identified, and then a sentiment status of a phrase or the sentence is analyzed according to a syntactic rule. Therefore, accuracy of determining a sentiment tendency of the sentiment phrase affects accuracy of determining the sentiment status of the phrase or the sentence. In other approaches, a sentiment dictionary has been built for sentiment phrases to help determine sentiment tendencies of the sentiment phrases. However, with the rapid development of social networking, an increasing quantity of new sentiment phrases are created. Especially for languages including basic Chinese words such as Chinese and Japanese, a phrase in the language may be formed by combining any two or more words. Therefore, there is an urgent need to provide a method for accurately determining sentiment polarities of new sentiment phrases.

SUMMARY

This application provides a natural language processing method and apparatus, to accurately determine a sentiment polarity of a newborn sentiment phrase.

According to a first aspect, a natural language processing method is provided, including obtaining a to-be-processed phrase, where the to-be-processed phrase comprises M words, determining polarity characteristic information of m to-be-processed words in the M words, where polarity characteristic information of an $i^{th}$ word in the m to-be-processed words includes n polarity characteristic values, each polarity characteristic value corresponds to one sentiment polarity, a $j^{th}$ polarity characteristic value of the $i^{th}$ word is determined based on a percentage of a quantity of target phrases in a prestored dictionary in a quantity of all phrases including the $i^{th}$ word in the prestored dictionary, and the target phrase is a phrase having a sentiment polarity corresponding to the $j^{th}$ polarity characteristic value, in all the phrases including the $i^{th}$ word, determining a polarity characteristic vector of the to-be-processed phrase based on the polarity characteristic information of the m to-be-processed words, where the polarity characteristic vector includes n groups of components in a one-to-one correspondence with n sentiment polarities, and a $j^{th}$ group of components in the n groups of components are determined based on a $j^{th}$ polarity characteristic value of each of the m to-be-processed words, and determining a sentiment polarity of the to-be-processed phrase based on the polarity characteristic vector of the to-be-processed phrase using a preset classifier, and outputting the sentiment polarity, where M, n, m, i, and j are all positive integers, M≥m, i is any value in [1,m], and j is any value in [1,n].

Therefore, in this embodiment of this application, the polarity characteristic vector of the to-be-processed phrase is determined based on polarity characteristic information of at least some words in the to-be-processed phrase, and the sentiment polarity is determined based on the polarity characteristic vector. In this way, a connection between a word and a phrase is fully used, helping improve accuracy of determining the sentiment polarity of the to-be-processed phrase.

In addition, in the natural language processing method provided in this embodiment of this application, no limitation is imposed on a sentiment polarity dimension, and a user can determine a sentiment polarity according to their own requirements using a corresponding classifier. This helps improve user experience.

With reference to the first aspect, in some implementations of the first aspect, when m>1, the determining a polarity characteristic vector of the to-be-processed phrase based on the polarity characteristic information of the m to-be-processed words includes combining polarity characteristic values in the polarity characteristic information of the m to-be-processed words into the polarity characteristic vector of the to-be-processed phrase, where the $j^{th}$ group of components include m polarity characteristic values, and the m polarity characteristic values are obtained by combining $j^{th}$ polarity characteristic values of all of the m to-be-processed words.

In a combination process, to correspond to each sentiment polarity dimension, a first polarity characteristic value of the $i^{th}$ word may be connected to an $n^{th}$ polarity characteristic value of an $(i-1)^{th}$ word, that is, a first polarity characteristic value of a word is connected to a last polarity characteristic value of a previous word.

In this embodiment of this application, a method for combining polarity characteristic values in polarity characteristic information of a plurality of to-be-processed words into the polarity characteristic vector of a to-be-processed phrase may be briefly referred to as a serial connection.

In this embodiment of this application, polarity characteristic information of at least some words in the to-be-processed phrase is connected in series, therefore, it is determined that an obtained sentiment polarity vector of the to-be-processed phrase includes the polarity characteristic information of the at least some words, considers sentiment polarities of the at least some words in the to-be-processed phrase, and has polarity characteristic values in more dimensions than polarity characteristic information of a word. In this case, the classifier is able to determine a sentiment polarity of the to-be-processed phrase based on the polarity characteristic values in more dimensions, helping obtain a more accurate determining result.

Optionally, when M>m, the method further includes determining the m to-be-processed words in the M words, where a greatest value of polarity characteristic values of any one of the m to-be-processed words is greater than any polarity characteristic value of any one of remaining (M−m) words. The m to-be-processed words are selected based on a greatest value in polarity characteristic information of each of the M words, that is, a word that greatly affects a sentiment polarity of the to-be-processed phrase is considered preferentially, and therefore less impact is exerted on determining of the sentiment polarity of the to-be-processed phrase.

Optionally, the combining polarity characteristic values in the polarity characteristic information of the m to-be-processed words into the polarity characteristic vector of the to-be-processed phrase includes combining the polarity characteristic values in the polarity characteristic information of the m to-be-processed words into the polarity characteristic vector of the to-be-processed phrase according to an arrangement order of the m to-be-processed words in the to-be-processed phrase.

Therefore, the n groups of components that correspond to the n sentiment polarities and that are obtained by connecting m polarity characteristic values in series according to the arrangement order of the m to-be-processed words in the to-be-processed phrase fully consider a connection between a word and a phrase, and also consider a difference in sentiment polarity that may result from different arrangement orders of words in the phrase. A polarity characteristic vector of the phrase obtained in this manner helps the classifier determine a sentiment polarity of the phrase accurately, thereby improving determining accuracy.

With reference to the first aspect, in some implementations of the first aspect, when m>1, the determining a polarity characteristic vector of the to-be-processed phrase based on the polarity characteristic information of the m to-be-processed words includes traversing the range [1,n] for x, and determining an $x^{th}$ group of components in the n groups of components in the polarity characteristic vector of the to-be-processed phrase in any one of the following manners finding an average of $x^{th}$ polarity characteristic values of all of the m to-be-processed words, finding a sum of $x^{th}$ polarity characteristic values of all of the m to-be-processed words, or finding a greatest value of $x^{th}$ polarity characteristic values of all of the m to-be-processed words, and combining the n groups of components to obtain the polarity characteristic vector of the to-be-processed phrase, where x is a positive integer.

In this way, each group of components in the n groups of components include a polarity characteristic value, each polarity characteristic value corresponds to one sentiment polarity, and a polarity characteristic value of the $j^{th}$ group of components is calculated based on $j^{th}$ polarity characteristic values of the m to-be-processed words.

Therefore, in this method, polarity characteristic information of each word of the to-be-processed phrase is considered, in addition, for determining of sentiment polarities in more dimensions, a processing process is more convenient and is more applicable to determining for the to-be-processed phrase based on the sentiment polarities in more dimensions. The determining based on the sentiment polarities in more dimensions also helps improve determining accuracy.

With reference to the first aspect, in some implementations of the first aspect, the method further includes treating the to-be-processed phrase as a processed phrase, and adding the processed phrase into the dictionary.

Adding the phrase determined by the classifier into the dictionary implements automatic extension to the dictionary, and professionals do not need to manually collect sentiment phrases, thereby greatly improving dictionary building efficiency. In addition, extension to the dictionary is extension to a training sample, thereby automatically extending the training sample.

With reference to the first aspect, in some implementations of the first aspect, the method further includes obtaining a training sample from the dictionary, where the training sample includes Y phrases with known sentiment polarities, and each phrase includes m to-be-processed words, and training the classifier using the training sample, where the training includes determining polarity characteristic information of m to-be-processed words included in a $y^{th}$ phrase in the training sample, where polarity characteristic information of an $s^{th}$ word in the m to-be-processed words includes n polarity characteristic values, each polarity characteristic value corresponds to one sentiment polarity, a $t^{th}$ polarity characteristic value of the $s^{th}$ word is obtained based on a percentage of a quantity of target phrases in the dictionary in a quantity of all phrases including the $s^{th}$ word in the dictionary, and the target phrase is a phrase having a sentiment polarity corresponding to the $t^{th}$ polarity characteristic value, in all the phrases including the $s^{th}$ word, determining a polarity characteristic vector of the $y^{th}$ phrase based on the polarity characteristic information of the m to-be-processed words included in the $y^{th}$ phrase, where the polarity characteristic vector of the $y^{th}$ phrase includes n groups of components in a one-to-one correspondence with the n sentiment polarities, and a $t^{th}$ group of components in the n groups of components are determined based on a $t^{th}$ polarity characteristic value of each of the m to-be-processed words, and training the classifier using a sentiment polarity of the $y^{th}$ phrase and the determined polarity characteristic vector of the $y^{th}$ phrase, where Y, y, s, and t are all positive integers greater than or equal to 1, y is any value in [1,Y], s is any value in [1,m], and [1,n] is traversed for t.

Therefore, in this embodiment of this application, the classifier is trained through machine learning, and in a training process, a polarity characteristic vector of a phrase is determined based on a polarity characteristic value of a word, and the classifier is trained using the polarity characteristic vector of the phrase and a known sentiment polarity. In this case, a connection between the word and the phrase is fully considered. A classifier trained in such manner is able to obtain a relatively accurate determining result when the classifier is used to determine a sentiment polarity of a phrase.

With reference to the first aspect, in some implementations of the first aspect, the method further includes using the processed phrase as the training sample to perform the training on the classifier.

Therefore, training the classifier again using the extended training sample can optimize a parameter in a classification model. This helps improve accuracy of a determining result.

With reference to the first aspect, in some implementations of the first aspect, the method further includes treating the to-be-processed phrase as a processed phrase, and adding the processed phrase into the dictionary, and using the processed phrase as the training sample to perform the training on the classifier.

That is, after the sentiment polarity of the to-be-processed phrase is determined, the to-be-processed phrase may be used as the processed phrase and added into the dictionary, to automatically extend the dictionary. In addition, the processed phrase added into the dictionary may be used as a new training sample, to train the classifier again in order to update the classifier.

According to a second aspect, a natural language processing apparatus is provided. The apparatus is configured to perform any one of the first aspect or the possible implementations of the first aspect. Specifically, the natural language processing apparatus may include a unit configured to perform the method according to any one of the first aspect or the possible implementations of the first aspect.

According to a third aspect, a natural language processing apparatus is provided, including a memory, a processor, and a communications interface. The memory is configured to store a computer program. The processor is configured to invoke the computer program from the memory, and run the computer program such that the natural language processing apparatus performs the method according to any one of the first aspect or the possible implementations of the first aspect.

Further, the processor is configured to obtain a to-be-processed phrase, where the to-be-processed phrase comprises M words, determine polarity characteristic information of m to-be-processed words in the M words, where polarity characteristic information of an $i^{th}$ word in the m to-be-processed words includes n polarity characteristic values, each polarity characteristic value corresponds to one sentiment polarity, a $j^{th}$ polarity characteristic value of the $i^{th}$ word is determined based on a percentage of a quantity of target phrases in a prestored dictionary in a quantity of all phrases including the $i^{th}$ word in the prestored dictionary, and the target phrase is a phrase having a sentiment polarity corresponding to the $j^{th}$ polarity characteristic value, in all the phrases including the $i^{th}$ word, determine a polarity characteristic vector of the to-be-processed phrase based on the polarity characteristic information of the m to-be-processed words, where the polarity characteristic vector includes n groups of components in a one-to-one correspondence with n sentiment polarities, and a $j^{th}$ group of components in the n groups of components are determined based on a $j^{th}$ polarity characteristic value of each of the m to-be-processed words, and determine a sentiment polarity of the to-be-processed phrase based on the polarity characteristic vector of the to-be-processed phrase using a preset classifier, and the communications interface is configured to output the sentiment polarity of the to-be-processed phrase.

According to a fourth aspect, a computer program product is provided. The computer program product includes a computer program (which may also be referred to as code or an instruction). When the computer program runs on a computer, the computer is enabled to perform the method according to any one of the first aspect or the possible implementations of the first aspect.

According to a fifth aspect, a computer-readable storage medium is provided, and is configured to store a computer program. The computer program includes an instruction used to perform the method according to any one of the first aspect or the possible implementations of the first aspect.

In the embodiments of this application, the polarity characteristic vector of the to-be-processed phrase is determined based on a polarity characteristic value of at least some words in the to-be-processed phrase in at least one dimension, and a sentiment polarity is determined based on a plurality of dimensions using the classifier. Based on the foregoing technical solution, the built polarity characteristic vector of the to-be-processed phrase is able to fully use a connection between a phrase and a word, helping improve accuracy of sentiment polarity determining. In addition, no limitation is imposed on the sentiment polarity dimension, and a user can analyze a sentiment polarity according to their own requirements using a corresponding classifier. This helps improve user experience.

DESCRIPTION OF EMBODIMENTS

The following describes technical solutions of this application with reference to accompanying drawings.

For ease of understanding of embodiments of this application, several nouns in this application are first described briefly.

1. Sentiment Analysis

Sentiment analysis is analyzing and determining subjective sentiment color of a specific text. Specifically, texts may be classified into two or more types commendatory or derogatory, through the sentiment analysis based on meanings and sentiment information expressed in the texts. Sentiment polarity classification is analyzing and determining positive and negative aspects (that is, commendatory and derogatory) or more types of sentiments expressed in texts. In this application, each sentiment type may be referred to as a sentiment polarity (polarity). For example, the sentiment type may include two types commendation and derogation, or may include four types happiness, anger, sadness, and joy, or may include seven types happiness (happy), like (like), sadness (sad), surprise (surprise), anger (angry), fear (fear), and disgust (disgust).

2. Dictionary

The dictionary may be a collection of phrases with a common attribute. For example, phrases with sentiment color constitute a sentimental dictionary, phrases with swear-phrase color constitute a dictionary of swear phrases, and phrases that represent names of places constitute a gazetteer.

3. Corpus

The corpus is also referred to as a free text. The corpus may be a word, a phrase, a sentence, a paragraph, an article, or the like, or any combination thereof.

4. Classifier (Classifier)

The classifier is a tool for determining a corpus type using various classification algorithms.

5. Training Sample

During building of a classifier using a classification algorithm, samples need to be used in parameter training performed on the classifier. These samples are referred to as training samples. For example, for a classifier with two classification types (or referred to as a binary classifier), two types of samples positive training samples and negative training samples, are needed.

6. Positive Training Sample

The positive training sample is a sample with a positive sentiment polarity that is used to constitute a training set during building of a binary classifier. That is, the positive training sample is used to constitute a positive training set.

7. Negative Training Sample

The negative training sample is a sample with a negative sentiment polarity that is used to constitute a training set during building of a binary classifier. That is, the negative training sample is used to constitute a negative training set.

Figure 1:
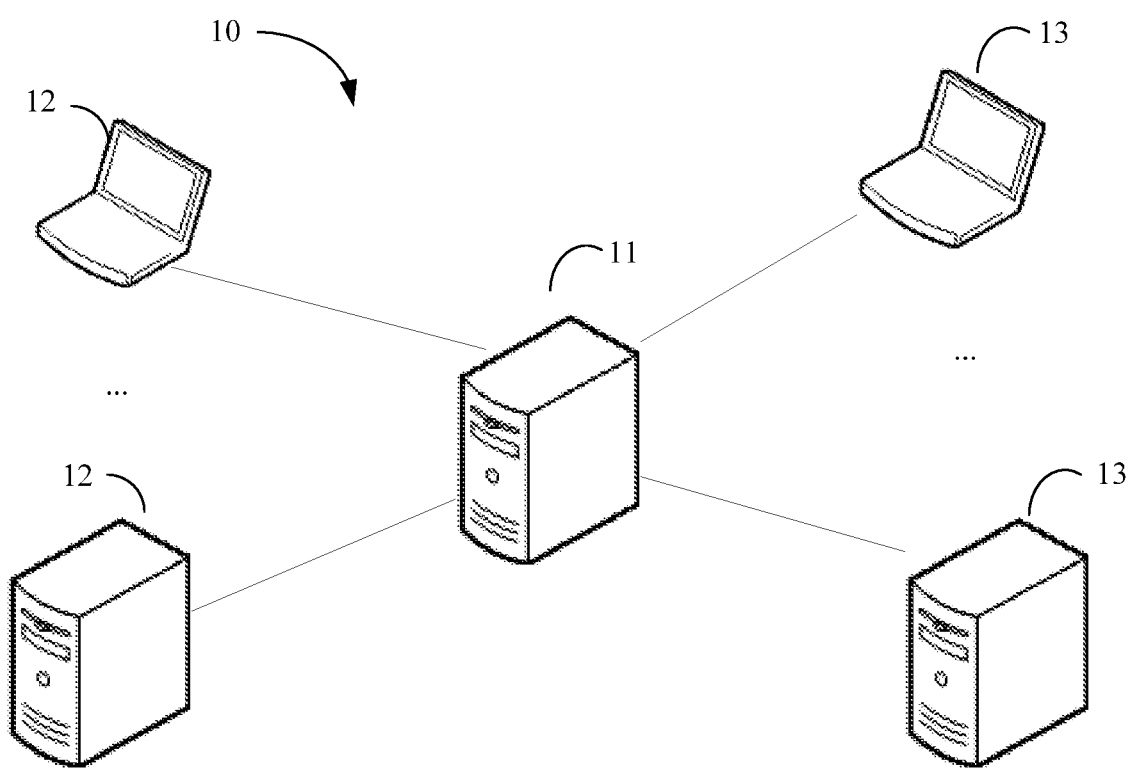
FIG. 1 is a schematic diagram of a system architecture to which a natural language processing method is applicable according to an embodiment of this application.

FIG. 1 is a schematic diagram of a communications system 10 to which a natural language processing method and apparatus are applicable according to an embodiment of this application. As shown in FIG. 1, the communications system 10 may include a server-side device 11. The server-side device 11 may be configured to perform sentiment analysis on obtained data (to be specific, a sentiment phrase, for example, a to-be-processed corpus or a training sample). In a possible design, a classifier may be deployed in the server-side device 11, and after obtaining data, the server-side device 11 may determine a sentiment polarity of a sentiment phrase using the classifier. In this embodiment of this application, the server-side device 11 may be configured to determine polarity characteristic information of a word, a polarity characteristic vector of a phrase, and a sentiment polarity of the phrase, and the server-side device 11 may be further configured to train the classifier. Specific functions of the server-side device 11 are described in detail with reference to a specific embodiment below.

Optionally, the communications system 10 further includes a data collection device 12 configured to obtain to-be-processed data, and transmit the to-be-processed data to the server-side device 11. Specifically, the data collection device 12 may obtain the to-be-processed data through manual input, network search, or the like.

Optionally, the communications system 10 further includes a client device 13 configured to perform next natural language processing based on a processing result from the server-side device 11, for example, perform sentiment analysis on a corpus (for example, a phrase, a sentence, or a paragraph) based on the processing result from the server-side device 11.

It should be understood that, the above-listed functions of the server-side device, the data collection device, and the client device are only an example, and shall not constitute any limitation on this application. Functions of the data collection device and the client device may alternatively be implemented by the server-side device. This is not limited in this application.

In addition, it should be further understood that, deployment of the server-side device, the data collection device, and the client device is not particularly limited in this application. For example, the server-side device, the data collection device, and the client device may be deployed in different physical devices, the different physical devices implement corresponding functions of the server-side device, the data collection device, and the client device, and the server-side device, the data collection device, and the client device that are deployed in the different physical devices may be connected to each other through a network. Alternatively, the server-side device, the data collection device, and the client device may be deployed in a same physical device, and functions of the server-side device, the data collection device, and the client device are implemented using the physical device. Alternatively, the data collection device and the client device may be integrated into a same terminal device or different terminal devices, and deployed in a same physical device together with the terminal device such that the physical device implements respective functions.

It should be understood that, the communications system shown in FIG. 1 is merely used for illustrative description, and shall not constitute any limitation on this application. In this application, quantities and deployment manners of server-side devices and client devices are not particularly limited. For example, there may be one server-side device, or a plurality of server-side devices. In an embodiment, the plurality of server-side devices may constitute a server cluster.

In this embodiment of this application, constituent components of the server-side device may include a processor, a hard disk, a memory, a system bus, and the like, and are similar to a general computer architecture. The server-side device needs to provide highly reliable services, and therefore may have higher requirements on a processing capability, stability, reliability, security, scalability, manageability, and the like.

It should be understood that, the terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in this embodiment of this application may be a mobile phone, a tablet computer (Pad), a computer with a wireless transceiving function, a virtual reality (VR) terminal device, an augmented reality (AR) terminal device, a wireless terminal in industrial control, a wireless terminal in self driving, a wireless terminal in remote medical care (remote medical), a wireless terminal in smart grid, a wireless terminal in transportation safety, a wireless terminal in smart city, a wireless terminal in smart home, or the like. In this application, the terminal device and a chip that can be disposed in the terminal device are collectively referred to as a terminal device.

It should be further understood that, when the server-side device, the data collection device, and the client device are deployed in different physical devices, the server-side device, the data collection device, and the client device may directly communicate with each other through a network, for example, Ethernet (for example, Ethernet implemented by a communication cable such as optical fiber). Alternatively, the server-side device, the data collection device, and the client device may indirectly communicate with each other through a forwarding network including one or more network devices. Alternatively, the server-side device, the data collection device, and the client device may communicate with each other through a radio access network.

In addition, the radio access network may use any communications system, for example, a Global System for Mobile Communications (GSM) system, a code-division multiple access (CDMA) system, a wideband code-division multiple access (WCDMA) system, a General Packet Radio Service (GPRS) system, a Long Term Evolution (LTE) system, an LTE Advanced (LTE-A) system, an LTE frequency division duplex (FDD) system, an LTE time division duplex (TDD) system, a Universal Mobile Telecommunications System (UMTS), a Worldwide Interoperability for Microwave Access (WIMAX) communications system, a next-generation communications system (for example, a 5th generation (5G) communications system), a fusion system of a plurality of access systems, an evolved system, or the like. The 5G system may also be referred to as a new radio access technology (NR) system.

It should be further understood that, the communications system shown in FIG. 1 is only a possible application scenario of this embodiment of this application and shall not constitute any limitation on this application. For example, the communications system may further include other devices.

Sentiment analysis has great business value and public service value. Texts in microblogs and various forums may be a corpora source for sentiment analysis. Enterprises may perform sentiment analysis on reviews or opinions of consumers on a product to obtain evaluation of the consumers on the product. For example, consumer preferences may be grasped through sentiment analysis on movie reviews and music reviews, or a government may perform sentiment analysis on news reviews to obtain an attitude of the mass to a news event.

With the rapid development of social networking, an increasing quantity of new phrases have been created. Many of these new phrases have sentiment color, or have sentiment polarities. Therefore, a method needs to be provided for performing sentiment polarity analysis on newborn sentiment phrases.

In addition, with the creation of new sentiment phrases, a sentiment dictionary needs to be maintained and updated. Therefore, a dictionary building technology emerges as the time requires. With the dictionary building technology, a sentiment phrase can be automatically found from a corpus and a sentiment polarity of the sentiment phrase is found in order to extend a dictionary. However, a sentiment polarity of a sentiment phrase cannot be highly accurately analyzed using current dictionary building technologies such as a pointwise mutual information (pointwise mutual information, PMI) method and a dictionary interpretation method. As a basis of sentiment analysis, if the sentiment dictionary cannot ensure relatively high accuracy, accuracy of sentiment analysis on a phrase, a sentence, and even a paragraph and an article is inevitably affected.

In view of this, this application provides a natural language processing method that can be used to analyze a sentiment polarity of an obtained sentiment phrase and perform accurate determining.

For ease of understanding, a process of sentiment analysis on a corpus is first described briefly.

Herein, the corpus may be the texts in the microblogs and various forums described above, or may be a word, a phrase, a phrase, a sentence, a paragraph, or an article, or any combination thereof. Assuming that an obtained corpus is a phrase, a sentence, a paragraph, or an article including one or more sentiment phrases, a sentiment polarity of each sentiment phrase may be first analyzed, and then sentiment analysis is performed on the phrase, the sentence, the paragraph, or the article based on the sentiment polarity of the sentiment phrase.

It should be understood that, the process of sentiment analysis on a corpus described above is merely a possible implementation, and shall not constitute any limitation on this application. This application provides a natural language processing method, mainly focusing on sentiment analysis on a basic sentiment phrase.

Figure 2:
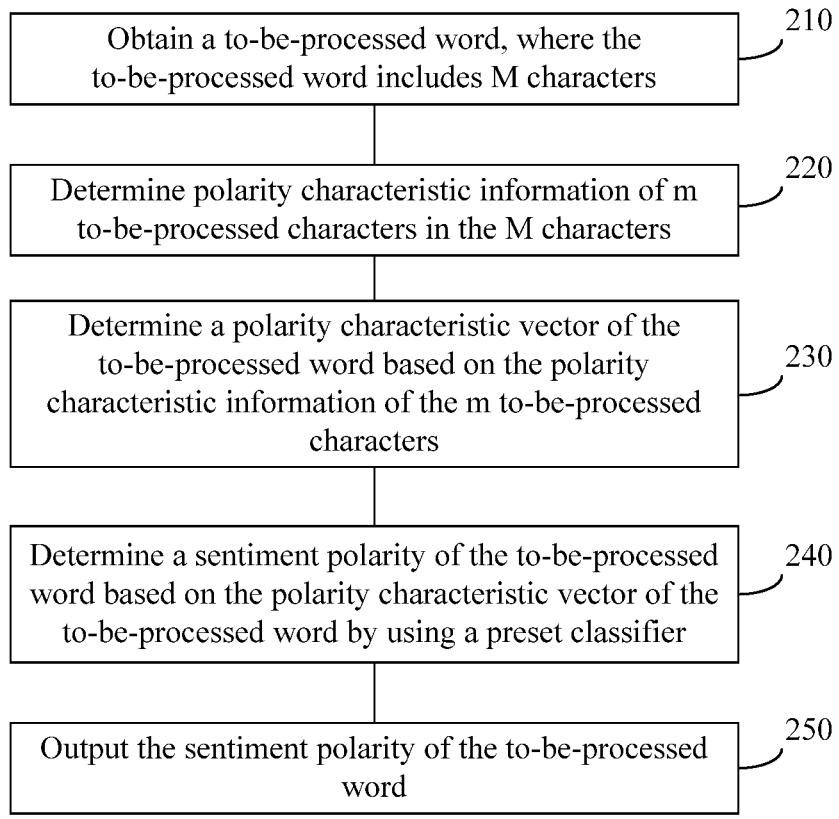
FIG. 2 is a schematic flowchart of a natural language processing method according to an embodiment of this application.

The following describes a natural language processing method in detail with reference to FIG. 2 according to an embodiment of this application.

It should be noted that, the natural language processing method provided in this embodiment of this application may be performed by a natural language processing apparatus in which a classifier is deployed. For example, the natural language processing apparatus may be the server-side device 11 shown in FIG. 1.

In addition, in this embodiment of this application, the classifier is used to determine a sentiment polarity of a sentiment phrase. For a preconfigured classifier, a sentiment polarity and a quantity of sentiment polarity dimensions on which sentiment analysis is based are defined. For example, the classifier may be preset to determine the sentiment polarity of the sentiment phrase based on two dimensions (for example, a positive polarity and a negative polarity), or the classifier may be set to determine the sentiment polarity of the sentiment phrase based on more dimensions. In this application, the quantity of sentiment polarity dimensions is not limited. However, it should be noted that, once the sentiment polarity and the quantity of sentiment polarity dimensions is preconfigured for the classifier, the classifier performs sentiment analysis based on the configured sentiment polarity and the configured quantity of sentiment polarity dimensions, and cannot perform sentiment analysis based on another quantity of dimensions or another type of sentiment polarity. In the following embodiment, it is assumed that the quantity of sentiment polarity dimensions in the classifier has been preconfigured.

It should be further noted that, the following merely describes in detail the method in this embodiment of this application using Chinese as an example, but this shall not constitute any limitation on this application. The method provided in this application is also applicable to Japanese, Korean, and other languages. In this type of languages, a phrase may be generated by randomly combining two or more words at any time, and a meaning of the generated phrase is related to a meaning of a single word.

FIG. 2 is a schematic flowchart of a natural language processing method 200 according to an embodiment of this application. As shown in FIG. 2, the method 200 may include steps 210 to 240.

In step 210, a natural language processing apparatus obtains a to-be-processed phrase, where the to-be-processed phrase includes M words.

Specifically, the to-be-processed phrase is a sentiment phrase that has not been collected in a sentiment dictionary. For example, the to-be-processed phrase may be a newly created sentiment phrase in a network. After the to-be-processed phrase is obtained, the to-be-processed phrase may be split into the M words. For example, a to-be-processed phrase "treasured calligraphy" is split into two words "treasured" and "calligraphy".

In step 220, polarity characteristic information of m to-be-processed words in the M words is determined, where M≥m≥1, and both M and m are integers.

Specifically, polarity characteristic information of a word may be obtained by combining polarity characteristic values of the phrase in all sentiment polarity dimensions. In addition, polarity characteristic information of each word includes n polarity characteristic values, and the n characteristic values are in a one-to-one correspondence with n sentiment polarities, where n≥1, and n is an integer.

In this case, a $j^{th}$ polarity characteristic value of an $i^{th}$ word represents a percentage of a quantity of phrases, included in a prestored dictionary, with a sentiment polarity corresponding to the $j^{th}$ polarity characteristic value in a quantity of all phrases including the $i^{th}$ word included in the prestored dictionary, where i is any value in [1,m], and j is any value in [1,n].

For example, it is assumed that n=2, that is, a polarity characteristic value of a word includes polarity characteristic values in two dimensions a positive polarity and a negative polarity. In the prestored dictionary, there are a total of 20 phrases including "calligraphy", among which there are 11 phrases with a positive polarity (that is, commendatory phrases, for example, polarities denoted in the sentiment dictionary may be "1"), eight phrases with a negative polarity (that is, derogatory phrases, for example, polarities denoted in the sentiment dictionary may be "2"), and one neutral phrase (that is, a phrase neither commendatory nor derogatory, for example, a polarity denoted in the sentiment dictionary may be "3"). Because n=2, polarity characteristic information of "calligraphy" includes two polarity characteristic values. A first polarity characteristic value may be corresponding to the positive polarity, and a second polarity characteristic value may be corresponding to the negative polarity. It can be calculated that the first polarity characteristic value of "calligraphy" is 0.55, and the second polarity characteristic value of "calligraphy" is 0.4, and therefore it can be obtained that the polarity characteristic information of "calligraphy" is represented as a two-dimensional vector (0.55,0.4).

In an embodiment, the natural language processing apparatus may determine polarity characteristic information of at least some words in the to-be-processed phrase. A value of m may be determined based on a preset quantity (for example, N, where N is greater than 1, and N is a positive integer) of dimensions of the classifier. A relationship between M and m is described in detail below with reference to specific steps.

In step 230, a polarity characteristic vector of the to-be-processed phrase is determined based on the polarity characteristic information of the m to-be-processed words.

In an embodiment, the polarity characteristic vector of the to-be-processed phrase is determined based on the polarity characteristic information of the at least some words in the to-be-processed phrase. The polarity characteristic vector of the to-be-processed phrase determined in step 230 may include n groups of components in a one-to-one correspondence with the n sentiment polarities. Each group of components include at least one polarity characteristic value. At least one polarity characteristic value included in a $j^{th}$ group of components may be determined based on a $j^{th}$ polarity characteristic value of each of the m to-be-processed words. Therefore, the polarity characteristic vector of the to-be-processed phrase may include at least n polarity characteristic values.

Herein, it should be noted that n represents a quantity of polarity characteristic values included in polarity characteristic information of a word, or a quantity of dimensions of sentiment polarities corresponding to the polarity characteristic information of the word. Correspondingly, N represents a quantity of dimensions in which the classifier determines a sentiment polarity. In this embodiment of this application, n≤N. For example, when the classifier determines a sentiment polarity of the to-be-processed phrase based on two dimensions the positive polarity and the negative polarity, the polarity characteristic information of the word may be represented using polarity characteristic values in the two dimensions the positive polarity and the negative polarity, that is, the polarity characteristic information of the word includes two polarity characteristic values, in other phrases, n=2, and N=2. For details, refer to the foregoing example. Alternatively, the polarity characteristic information of the word may be represented using a polarity characteristic value of either of the polarities, and an estimation value of a polarity characteristic value of the other polarity can be inferred, that is, the polarity characteristic information of the word includes only one polarity characteristic value, in other phrases, n=1, and N=2.

Still using "treasured calligraphy" as an example, when the classifier determines a sentiment polarity of the to-be-processed phrase based on the two dimensions the positive polarity and the negative polarity, the polarity characteristic information of the word may be represented using a polarity characteristic value of the positive polarity or a polarity characteristic value of the negative polarity, that is, polarity characteristic information of "calligraphy" may be represented as a one-dimensional vector (0.55) or (0.4), and a polarity characteristic vector of the phrase obtained in this case is also based on a same sentiment polarity. In this case, the classifier needs to be configured in advance, to specify that a polarity characteristic vector of a currently input phrase is based on a sentiment polarity dimension, thereby helping the classifier perform accurate determining.

In this embodiment of this application, the determining a polarity characteristic vector of the to-be-processed phrase based on the polarity characteristic information of the m to-be-processed words is processing polarity characteristic information of each of the m to-be-processed words according to a preset rule, to obtain the polarity characteristic vector of the to-be-processed phrase.

Specifically, a process of determining the polarity characteristic vector of the to-be-processed phrase in step 230 may be performed in any one of the following manners.

Manner 1. Polarity characteristic values in the polarity characteristic information of the m to-be-processed words are combined into the polarity characteristic vector of the to-be-processed phrase.

The polarity characteristic vector of the to-be-processed phrase obtained in this way includes the n groups of components in a one-to-one correspondence with the n sentiment polarities. The $j^{th}$ group of components in the n groups of components include m polarity characteristic values. The m polarity characteristic values are obtained by combining $j^{th}$ polarity characteristic values of all of the m to-be-processed words.

In this embodiment of this application, the manner of combining polarity characteristic values in the polarity characteristic information of the m to-be-processed words into the polarity characteristic vector of the to-be-processed phrase may be briefly referred to as connecting the polarity characteristic information of the m to-be-processed words in series.

In a combination process, to correspond to each sentiment polarity dimension, a first polarity characteristic value of the $i^{th}$ word may be connected to an $n^{th}$ polarity characteristic value of an $(i-1)^{th}$ word, that is, a first polarity characteristic value of a latter word is connected to a last polarity characteristic value of a former word. In other phrases, an arrangement order of n pieces of polarity characteristic information of each of the m to-be-processed words keeps unchanged.

Manner 2. A polarity characteristic value in an $x^{th}$ group of components is determined in any one of the following manners based on a polarity characteristic value that corresponds to an $x^{th}$ sentiment polarity and that is in n polarity characteristic values of each of the m to-be-processed words summation, averaging, or finding a greatest value, where the range [1,n] is traversed for x, and x is a positive integer.

That is, the range [1,n] is traversed for x, and the $x^{th}$ group of components in the n groups of components in the polarity characteristic vector of the to-be-processed phrase are determined in any one of the following manners finding an average of $x^{th}$ polarity characteristic values of all of the m to-be-processed words, finding a sum of $x^{th}$ polarity characteristic values of all of the m to-be-processed words, or finding a greatest value of $x^{th}$ polarity characteristic values of all of the m to-be-processed words, and the n groups of components are combined to obtain the polarity characteristic vector of the to-be-processed phrase.

In the n groups of components included in the polarity characteristic vector of the to-be-processed phrase obtained in this way, each group of components include a polarity characteristic value, and each polarity characteristic value may be calculated based on the polarity characteristic information of the m to-be-processed words.

Manner 1 and manner 2 are described in detail below with reference to specific embodiments.

It should be understood that, the two different implementations provided above are merely an example, and shall not constitute any limitation on this application.

In step 240, a sentiment polarity of the to-be-processed phrase is determined based on the polarity characteristic vector of the to-be-processed phrase using a preset classifier.

In an embodiment, the polarity characteristic vector of the to-be-processed phrase is input into the preset classifier such that the classifier determines and outputs the sentiment polarity of the to-be-processed phrase.

Further, the classifier may be configured to determine the sentiment polarity of the to-be-processed phrase, or classify the sentiment polarity of the to-be-processed phrase. In this embodiment of this application, the classifier may determine a type of data (for example, the to-be-processed phrase or a training sample) using a classification algorithm. The classification algorithm may be obtained through training based on a phrase with a known sentiment polarity, or may be obtained according to a rule designed based on personal experience.

In step 250, the sentiment polarity of the to-be-processed phrase is output.

In this embodiment of this application, the classifier may be configured in the natural language processing apparatus, and the natural language processing apparatus may be configured only to determine the sentiment polarity of the to-be-processed phrase. In this case, after determining the sentiment polarity of the to-be-processed phrase, the classifier may output, through a communications interface of the natural language processing apparatus, a determining result of the sentiment polarity of the phrase to another apparatus, for example, a client device such that the other apparatus performs next sentiment analysis on a corpus based on the determining result.

The natural language processing apparatus may alternatively be configured to further perform sentiment analysis on a corpus (for example, a phrase, a sentence, or a paragraph) based on the sentiment polarity of the phrase. In this case, after determining the sentiment polarity of the to-be-processed phrase, the classifier may output the processing result to another module or unit configured to perform corpus sentiment analysis, in the natural language processing apparatus.

It can be learned from the foregoing description that the natural language processing apparatus may determine the polarity characteristic vector of the to-be-processed phrase in different implementations. Because different implementations are used, the polarity characteristic vector of the to-be-processed phrase determined based on the polarity characteristic information of the same m to-be-processed words may include different quantities of polarity characteristic values. Therefore, when a used implementation is determined, a quantity (for ease of differentiation and description, denoted as P, where it can be understood that P≥n, and P is an integer) of polarity characteristic values included in the polarity characteristic vector, to be input into the classifier, of the to-be-processed phrase can be determined, or a quantity of polarity characteristic values included in the polarity characteristic vector, to be input into the classifier, of the to-be-processed phrase may be preset. When the classifier determines a quantity N of sentiment polarity dimensions, the classifier may accurately determine the sentiment polarity of the to-be-processed phrase based on a preset correspondence between a sentiment polarity and each polarity characteristic value in an input polarity characteristic vector of a phrase.

For a preconfigured classifier, the quantity N of dimensions for sentiment polarity determining and the quantity P of polarity characteristic values included in the polarity characteristic vector, to be input into the classifier, of the to-be-processed phrase may be predetermined, based on the predetermined two parameters, a quantity n of polarity characteristic values included in polarity characteristic information of a word can be determined, and a preset quantity $m_0$ of to-be-processed words is determined based on a manner of determining a polarity characteristic vector of a phrase.

However, it should be understood that, $m_1$ is only a parameter introduced for ease of description and understanding of this embodiment of this application, and shall not constitute any limitation on this application. When the natural language processing apparatus is performing the method 200, or for the preconfigured classifier, $m_0$ may be predefined.

If the polarity characteristic vector of the phrase is determined in manner 1, n≤N, and $m_0$=P/n. If the polarity characteristic vector of the phrase is determined in manner 2, n=N, and $m_0$ may be any positive integer.

Manner 1 and manner 2 are described in detail below with reference to specific examples.

Manner 1.

In manner 1, the polarity characteristic information of the m (in several cases described below, when M>$m_0$, m=$m_0$, or when M≤$m_0$, m=M) to-be-processed words is combined in series into the polarity characteristic vector of the to-be-processed phrase. A quantity of polarity characteristic values included in the polarity characteristic vector of the to-be-processed phrase determined in this way may be an integer multiple of n.

The following describes in detail a specific process of determining the polarity characteristic vector of the to-be-processed phrase in manner 1 with reference to different cases.

In this embodiment, assuming that the preset quantity N of sentiment polarity dimensions in the classifier is 2, which corresponds to two dimensions the positive polarity and the negative polarity, if the quantity P of polarity characteristic values included in the polarity characteristic vector, to be input into the classifier, of the to-be-processed phrase is 4, polarity characteristic information of a word in the to-be-processed phrase may include two polarity characteristic values, or if the quantity P of polarity characteristic values included in the polarity characteristic vector, input into the classifier, of the to-be-processed phrase is 2, polarity characteristic information of a word in the to-be-processed phrase may include one polarity characteristic value.

Case a.

If the polarity characteristic vector, to be input into the classifier, of the to-be-processed phrase includes four polarity characteristic values, that is, P=4, and the polarity characteristic information of the word includes two polarity characteristic values, that is, n=2, $m_0$=P/n=2. If a quantity M of words in the to-be-processed phrase is 2, M=$m_0$. In this case, the polarity characteristic vector of the to-be-processed phrase may be determined directly based on the polarity characteristic information of the M words, that is, m=M.

For example, in the to-be-processed phrase "treasured calligraphy", polarity characteristic information of "calligraphy" may be represented as (0.55,0.4), and polarity characteristic information of "treasured" may be represented as (0.91,0.09), it can be obtained through serial connection that a polarity characteristic vector of the to-be-processed phrase "treasured calligraphy" is (0.55,0.4,0.91,0.09) or (0.91,0.09, 0.55,0.4). (0.55,0.91) is a polarity characteristic value corresponding to the positive polarity, and (0.4,0.09) is a characteristic value corresponding to the negative polarity. In an embodiment, (0.55,0.91) and (0.4,0.09) are two groups of components in the polarity characteristic vector of "treasured calligraphy" that are respectively corresponding to the positive polarity and the negative polarity. Each group of components include m polarity characteristic values in a one-to-one correspondence with the m to-be-processed words.

Different word arrangement orders may cause totally different meanings and sentiment polarities of an entire phrase. Therefore, the polarity characteristic vector of the to-be-processed phrase obtained by sequentially connecting the polarity characteristic information of the m to-be-processed words in series according to an arrangement order of the m to-be-processed words in the to-be-processed phrase helps the classifier accurately determine the sentiment polarity of the phrase.

Optionally, step 230 further includes combining the polarity characteristic values in the polarity characteristic information of the m to-be-processed words into the polarity characteristic vector of the to-be-processed phrase according to an arrangement order of the m to-be-processed words in the to-be-processed phrase.

That is, the polarity characteristic information of the m to-be-processed words may be connected in series according to the arrangement order of the m to-be-processed words in the to-be-processed phrase. An arrangement order of m polarity characteristic values included in each group of components in the n groups of components in the polarity characteristic vector of the to-be-processed phrase obtained through serial connection is the same as the arrangement order of the m to-be-processed words in the to-be-processed phrase.

Therefore, it can be further obtained that the polarity characteristic vector of "treasured calligraphy" is (0.55,0.4, 0.91,0.09).

Case b.

If the polarity characteristic vector, to be input into the classifier, of the to-be-processed phrase includes two polarity characteristic values, that is, P=2, and the polarity characteristic information of the word includes one polarity characteristic value, that is, n=1, $m_0$=P/n=2. If a quantity M of words in the to-be-processed phrase is 2, M=$m_0$. In this case, the polarity characteristic vector of the to-be-processed phrase may be determined directly based on the polarity characteristic information of the M words, that is, m=M.

Still using the to-be-processed phrase "treasured calligraphy" as an example, polarity characteristic information of "calligraphy" may be represented as (0.55), and polarity characteristic information of "treasured" may be represented as (0.91), it can be obtained through serial connection that a polarity characteristic vector of the to-be-processed phrase "treasured calligraphy" is (0.55,0.91) or (0.91,0.55). If the polarity characteristic information of the m to-be-processed words is connected in series according to an arrangement order of the m to-be-processed words in the to-be-processed phrase, it can be obtained that the polarity characteristic vector of "treasured calligraphy" is (0.55,0.91).

That is, the polarity characteristic vector of the to-be-processed phrase in this embodiment is obtained by combining a polarity characteristic value of a sentiment polarity dimension of each word. In this case, although n=1, N=2 and the classifier can still determine the sentiment polarity based on two sentiment polarity dimensions.

Case c.

If the polarity characteristic vector, to be input into the classifier, of the to-be-processed phrase includes four polarity characteristic values, that is, P=4, and the polarity characteristic information of the word includes two polarity characteristic values, that is, n=2, $m_0$=P/n=2. If a quantity M of words in the to-be-processed phrase is 3, M>$m_0$. In this case, the m (m=2) to-be-processed words can be determined in the M (M=3) words, that is, m<M.

For example, a to-be-processed phrase "what the hell" including three words. If a polarity characteristic vector of the to-be-processed phrase is determined based on polarity characteristic information of the three words, the polarity characteristic vector includes six polarity characteristic values different from the preset quantity of, to be specific, 4, polarity characteristic vectors, input into the classifier, of the to-be-processed phrase. In a possible implementation, the m to-be-processed words may be determined in the M words. In this embodiment, M=3, and m=2.

Specifically, the two to-be-processed words may be determined according to a preset rule. For example, it is specified that a first word and a last word in three words included in a to-be-processed phrase are selected to build a polarity characteristic vector of the to-be-processed phrase, or it is specified that a noun is preferentially selected from the three words included in the to-be-processed phrase.

Optionally, when M>m, before step 220, the method further includes determining the m to-be-processed words in the M words, where a greatest value of polarity characteristic values of any one of the m to-be-processed words is greater than any polarity characteristic value of any one of remaining (M−m) words.

Specifically, a greatest value of polarity characteristic values of each of the M words may be determined based on n polarity characteristic values of each of the M words, and then words corresponding to first m values in M greatest values sorted in descending order are determined as the m to-be-processed words.

Alternatively, greatest values of n polarity characteristic values of each of the M words are sorted in descending order, to obtain M greatest values, and words corresponding to first m values in the M greatest values are determined as the m to-be-processed words.

A greatest value of n polarity characteristic values of any one of the m to-be-processed words determined based on the foregoing method is greater than any polarity characteristic value of any one of remaining (M−m) words.

It should be noted that herein, for ease of description and understanding, the process of determining the m to-be-processed words is described using an example in which the greatest values of the polarity characteristic values of the M words are sorted. Actually, in the process of determining the m to-be-processed words in the M words, the natural language processing apparatus does not necessarily perform sorting. Therefore, the foregoing descriptions shall not constitute any limitation on this application. Any determined m to-be-processed words of which any one satisfies that a greatest value of polarity characteristic values of the any one of the m to-be-processed words is greater than any polarity characteristic value of any one of remaining (M−m) words shall fall within the protection scope of this application.

Using "what the hell" as an example, polarity characteristic information of "what" may be represented as (0.47, 0.53), polarity characteristic information of "the" may be represented as (0.51,0.49), and polarity characteristic information of "hell" may be represented as (0.32,0.68). Through a comparison between two polarity characteristic values of each of the three words, a greatest value of polarity characteristic values of each word can be obtained. Details are as follows. A greatest value of polarity characteristic values of "what" is 0.53, a greatest value of polarity characteristic values of "the" is 0.51, and a greatest value of polarity characteristic values of "hell" is 0.68. Two greatest values, to be specific, 0.53 and 0.68, are selected from the three greatest values. Words corresponding to the two values are "what" and "hell". According to an arrangement order of "what" and "hell" in "what the hell", it can be obtained that a polarity characteristic vector of "what the hell" may be represented as (0.47,0.53,0.32,0.68).

It should be understood that, when M>m, determining the m to-be-processed words in the M words to obtain the polarity characteristic vector including the preset quantity (to be specific, P as described above) of polarity characteristic values is merely a possible implementation, and shall not constitute any limitation on this application. This application should not be limited thereto, either.

For example, the polarity characteristic vector of the to-be-processed phrase including the P polarity characteristic values can also be obtained by performing pairwise averaging on polarity characteristic values of a plurality of words in each sentiment polarity. Still using "what the hell" as an example, pairwise averaging may be performed on three polarity characteristic values in the positive polarity, (0.47,0.51,0.32), to obtain (0.49,0.415), pairwise averaging may be performed on three polarity characteristic values in the negative polarity, (0.53,0.49,0.68), to obtain (0.51, 0.585), and then a polarity characteristic vector of "what the hell", (0.49,0.415,0.51,0.585), can be obtained through serial connection. In this case, m=M. In an embodiment, polarity characteristic information of each of the M words included in the to-be-processed phrase needs to be determined.

Case d.

If the polarity characteristic vector, to be input into the classifier, of the to-be-processed phrase includes six polarity characteristic values, that is, P=6, and the polarity characteristic information of the word includes two polarity characteristic values, that is, n=2, $m_0$=P/n=3. If a quantity M of words in the to-be-processed phrase is 2, M<$m_0$. In this case, even if polarity characteristic information of the M words is connected together in series, six polarity characteristic values cannot be obtained.

This application additionally provides a supplement method. In an embodiment, at least one polarity characteristic value whose value is 1/P (in this embodiment, P=2, 1/P=0.5) is added to the rear of the polarity characteristic vector of the phrase obtained by combining polarity characteristic information of the M words, until a quantity of polarity characteristic values included in the polarity characteristic vector of the to-be-processed phrase is equal to P.

Still using to-be-processed phrase "treasured calligraphy" as an example, it has been described in case a that the polarity characteristic vector of the phrase, (0.55,0.4,0.91, 0.09), can be determined based on the polarity characteristic information of the words, but the quantity of polarity characteristic values included in the polarity characteristic vector, to be input into the classifier, of the to-be-processed phrase cannot be 6, either. In this embodiment, the polarity characteristic vector of "treasured calligraphy", (0.55,0.4, 0.91,0.09,0.5,0.5), can be obtained using the supplement method. Therefore, in case d, m=M.

It should be understood that, the above listed specific methods for determining the polarity characteristic vector of the to-be-processed phrase in different cases are merely possible implementations, and shall not constitute any limitation on this application. Any implementation in which the polarity characteristic vector of the to-be-processed phrase is determined based on polarity characteristic information of a word to ensure that the polarity characteristic vector of the to-be-processed phrase is related to words that constitute the to-be-processed phrase shall fall within the protection scope of this application.

It should be further understood that, the polarity characteristic information of the word in the foregoing example is used for merely illustrative description, and shall not constitute any limitation on this application.

Manner 2.

In manner 2, the polarity characteristic vector of the to-be-processed phrase is determined based on the polarity characteristic information of the m (in manner 2, a value of $m_0$ is not limited, and for ease of understanding, $m_0$ is not introduced, and in manner 2, m=M can always hold true) to-be-processed words through averaging, finding a greatest value, or summation. A quantity of polarity characteristic values included in the polarity characteristic vector of the to-be-processed phrase determined in this way may be the same as the quantity of polarity characteristic values included in the polarity characteristic information of the word, and is also n. That is, the quantity P of polarity characteristic values included in the polarity characteristic vector, to be input into the classifier, of the to-be-processed phrase is equal to n. The classifier can determine a polarity based on P values in the input polarity characteristic vector of the to-be-processed phrase and based on a sentiment polarity in N (N=P) dimensions.

In this embodiment, it is assumed that a preset quantity of sentiment polarity dimensions in the classifier is 7, that is, P=7, and the dimensions correspond to seven dimensions of happiness, like, sadness, surprise, anger, fear, and disgust. In this case, the polarity characteristic information of the word in the to-be-processed phrase may include seven polarity characteristic values, and the polarity characteristic vector of the to-be-processed phrase may also include seven polarity characteristic values.

For example, in a to-be-processed phrase "aesthetic mood", polarity characteristic information of "aesthetic" may be represented as (0.23,0.57,0.02,0.05,0.06,0.00,0.07), and polarity characteristic information of "mood" may be represented as (0.44,0.32,0.04,0.03,0.08,0.03,0.06). If the polarity characteristic vector of the to-be-processed phrase is determined through averaging, a polarity characteristic vector of "aesthetic mood", (0.335,0.445,0.03,0.04,0.07,0.015, 0.65), can be obtained.

For another example, in a to-be-processed phrase "bad prodigal son", polarity characteristic information of "bad" may be represented as (0.03,0.06,0.25,0.02,0.15,0.16,0.33), polarity characteristic information of "prodigal" may be represented as (0.28,0.37,0.10,0.06,0.04,0.02,0.13), and polarity characteristic information of "son" may be represented as (0.08,0.21,0.13,0.04,0.12,0.03,0.39). If the polarity characteristic vector of the to-be-processed phrase is determined through finding a greatest value, a polarity characteristic vector of "bad prodigal son", (0.28,0.37,0.25, 0.06,0.15,0.16,0.39), can be obtained.

It should be understood that, the above described specific method for determining the polarity characteristic vector based on the polarity characteristic information of the m to-be-processed words are merely used for illustrative description, and shall not constitute any limitation on this application.

It should be further understood that, a use scenario of manner 1 or manner 2 as an example is not limited in this application. For example, in the embodiment described in manner 1 in which the sentiment polarity of the to-be-processed phrase is determined based on two sentiment polarity dimensions, the polarity characteristic vector of the to-be-processed phrase may alternatively be determined in manner 2, likewise, in the embodiment described in manner 2 in which the sentiment polarity of the to-be-processed phrase is determined based on a plurality of sentiment polarity dimensions, the polarity characteristic vector of the to-be-processed phrase may alternatively be determined in manner 1.

Optionally, the method 200 further includes treating the to-be-processed phrase as a processed phrase, and adding the processed phrase into the dictionary.

That is, after the sentiment polarity of the to-be-processed phrase is determined using the foregoing method, the to-be-processed phrase may be used as a processed phrase with a known sentiment polarity, and added into the dictionary, to extend the dictionary.

Optionally, the processed phrase added into the dictionary may be used as a training sample to update polarity characteristic information of a word and a polarity characteristic vector of a phrase and optimize a parameter in a classification model by retraining the classifier.

Therefore, in this embodiment of this application, the polarity characteristic vector of the to-be-processed phrase is determined based on polarity characteristic information of at least some words in the to-be-processed phrase, and the sentiment polarity is determined based on the polarity characteristic vector. In this way, a connection between a word and a phrase is fully used, helping improve accuracy of determining the sentiment polarity of the to-be-processed phrase. In addition, no limitation is imposed on the sentiment polarity dimension, and users can determine a sentiment polarity according to their own requirements using a corresponding classifier. This helps improve user experience.

In addition, the classifier provided in this application may be obtained through machine training. In the machine training process, a large quantity of training samples are usually learned using a machine learning classification algorithm, and therefore an input corpus can be accurately analyzed and determined. This helps improve accuracy of determining.

Figure 3:
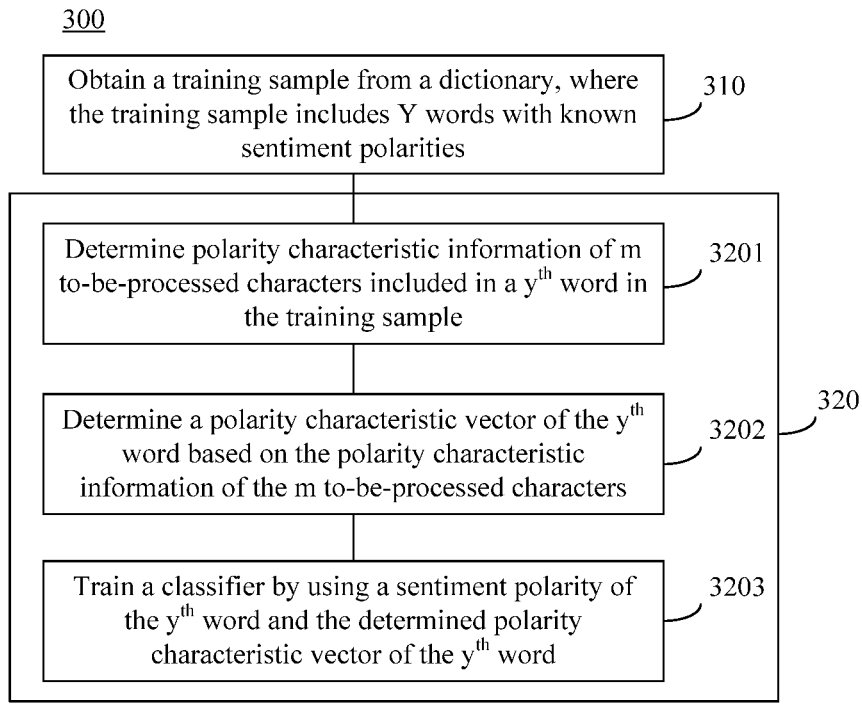
FIG. 3 is a schematic flowchart of a classifier training method according to another embodiment of this application.

The following describes in detail a specific process of training a classifier with reference to FIG. 3.

It should be noted that, a classifier training method provided in this embodiment of this application may be performed by a classifier training apparatus, and a classifier may be deployed in the apparatus. For example, the classifier training apparatus may be the server-side device 11 shown in FIG. 1, or may be another apparatus in which a classifier is deployed, and the classifier is configured in another apparatus after being trained. A specific form of the classifier training apparatus is not limited in this application.

It should be further noted that, the classifier in the method 300 described in the following embodiment may be the classifier in the method 200. Therefore, a preset quantity of dimensions used by the classifier to determine a sentiment polarity may also be N, polarity characteristic information of each word in a training sample may also include n polarity characteristic values, and a polarity characteristic vector of a phrase determined based on the polarity characteristic information of the word may also include at least n polarity characteristic values.

FIG. 3 is a schematic flowchart of a classifier training method 300 according to another embodiment of this application. As shown in FIG. 3, the method 300 includes step 310 and step 320.

In step 310, a classifier training apparatus obtains a training sample from a dictionary, where the training sample includes Y phrases with known sentiment polarities, and each phrase includes m to-be-processed words.

Specifically, a plurality of phrases with known sentiment polarities are prestored in a sentiment dictionary, and the classifier training apparatus may use the plurality of phrases with known sentiment polarities as a training sample to train a classifier. For example, if the classifier is set to determine a sentiment polarity of a phrase based on a positive polarity and a negative polarity, the training sample may include a positive training sample and a negative training sample.

Each phrase may include m to-be-processed words. The m to-be-processed words may be some or all words included in a phrase used as the current training sample. In other phrases, the phrase used as the training sample may include at least m words.

It should be understood that, a value of m is the same as the value of the quantity m of to-be-processed words described in the method 200, and when a polarity characteristic vector of a phrase is determined in different implementations, preset quantities $m_0$ of to-be-processed words may be different. Values of m may alternatively be different with reference to quantities of words included in different training samples. For example, if the polarity characteristic vector of the phrase is determined in manner 1 in the method 200, the preset quantity $m_0$ of to-be-processed words satisfies $m_0 = P/n$, and when $m_0 < M$, $m = m_0$, or when $m_0 \geq M$, $m = M$, if the polarity characteristic vector of the phrase is determined in manner 2 in the method 200, the preset quantity $m_0$ of to-be-processed words may be any positive integer, and m may also be any positive integer.

For example, a positive training sample includes "congratulations", "auspicious", "single-mindedness", and the like, the negative training sample includes "embezzlement", "hates", "vexatious", and the like.

For another example, a training sample with a sentiment polarity of "like" includes "poetic and picturesque", a training sample with a sentiment polarity of "happiness" includes "happy", a training sample with a sentiment polarity of "sadness" includes "sad", a training sample with a sentiment polarity of "surprise" includes "surprise", a training sample with a sentiment polarity of "anger" includes "angry", a training sample with a sentiment polarity of "fear" includes "framing", and a training sample with a sentiment polarity of "disgust" includes "bores".

In step 320, classifier is trained using the training sample. The training includes the following.

3201. Determine polarity characteristic information of m to-be-processed words included in a $y^{th}$ (y is any value in [1,Y], and both y and Y are integers) phrase in the training sample, where polarity characteristic information of an $s^{th}$ (s is any value in [1,m], and s is an integer) word in the m to-be-processed words includes n polarity characteristic values, each polarity characteristic value corresponds to one sentiment polarity, a $t^{th}$ (t is any value in [1,n], and t is an integer) polarity characteristic value of the $s^{th}$ word is obtained based on a percentage of a quantity of target phrases in the dictionary in a quantity of all phrases including the $s^{th}$ word in the dictionary, and the target phrase is a phrase having a sentiment polarity corresponding to the $t^{th}$ polarity characteristic value, in all the phrases including the $s^{th}$ word.

3202. Determine a polarity characteristic vector of the $y^{th}$ phrase based on the polarity characteristic information of the m to-be-processed words included in the $y^{th}$ phrase, where the polarity characteristic vector of the $y^{th}$ phrase includes n groups of components in a one-to-one correspondence with the n sentiment polarities, and a $t^{th}$ group of components in the n groups of components are determined based on a $t^{th}$ polarity characteristic value of each of the m to-be-processed words.

3203. Train the classifier using a sentiment polarity of the $y^{th}$ phrase and the determined polarity characteristic vector of the $y^{th}$ phrase.

Specifically, when a determining manner of a polarity characteristic vector of a phrase is determined, the classifier training apparatus may determine, based on a quantity N of dimensions used by the classifier to determine a sentiment polarity, a quantity P of polarity characteristic values included in the polarity characteristic vector, to be input into the classifier, of the phrase, where polarity characteristic information of a word includes n polarity characteristic values, and may further determine a quantity of polarity characteristic values included in polarity characteristic information of each word.

For example, if the polarity characteristic vector of the phrase is determined in manner 1 in the method 200, the preset quantity N of dimensions used by the classifier satisfies N=2, and the quantity P of polarity characteristic values included in the polarity characteristic vector, to be input into the classifier, of the phrase is 4, it can be determined that polarity characteristic information of at least some words in the following phrases separately includes two polarity characteristic values for "Ji Xiang", "Ji" corresponds to (0.93,0.07) and "Xiang" corresponds to (0.87, 0.13), for "Chao He", "Chao" corresponds to (0.56,0.44) and "He" corresponds to (0.92,0.08), for "Yi Xin Yi Yi", polarity characteristic information of two of the four words is determined, to be specific, "Xin" corresponds to (0.64,0.36) and the last "Yi" corresponds to (0.73,0.27), for "Tan Wu", "Tan" corresponds to (0.33,0.67) and "Wu" corresponds to (0.12,0.88), for "Huai Hen", "Huai" corresponds to (0.64, 0.36) and "Hen" corresponds to (0.05,0.95), for "Wu Li Qu Nao", polarity characteristic information of two of the four words is determined, to be specific, "Li" corresponds to (0.59,0.41) and "Nao" corresponds to (0.11,0.89).

When the polarity characteristic vector of the phrase is determined in manner 1, the following polarity characteristic vector of each phrase can be obtained based on the above listed polarity characteristic information of each word "Ji Xiang": (0.93,0.07,0.87,0.13),
"Chao He": (0.56,0.44,0.92,0.08),
"Yi Xin Yi Yi": (0.64,0.36,0.73,0.27),
"Tan Wu": (0.33,0.67,0.12,0.88),
"Huai Hen": (0.64,0.36,0.05,0.95),
"Wu Li Qu Nao": (0.59,0.41,0.11,0.89).

It should be understood that, the above listed are merely an example, and shall not constitute any limitation on this application.

Likewise, if the polarity characteristic vector of the phrase is determined in manner 2 in the method 200, the preset quantity N of dimensions used by the classifier satisfies N=7, and the quantity P of polarity characteristic values included in the polarity characteristic vector, to be input into the classifier, of the phrase is 7, it can be determined that polarity characteristic information of each word in the following phrases includes seven polarity characteristic values.

For brevity, no examples are provided herein for description.

It should be understood that, a specific process in which the classifier training apparatus determines a polarity characteristic vector of a phrase based on polarity characteristic information of a word is the same as the specific process, in step 230 of the method 200, in which the natural language processing apparatus determines the polarity characteristic vector of the to-be-processed phrase based on the polarity characteristic information of the word. For brevity, detailed descriptions of the specific process are omitted herein.

The classifier training apparatus may train the classifier using a known sentiment polarity of each phrase and the polarity characteristic vector of each phrase determined using the foregoing method.

Specifically, training of the classifier can be understood as a process of training each parameter in a classification model using a classification algorithm.

In this embodiment of this application, the classifier training apparatus may build a sentiment polarity classification model using a machine learning classification algorithm (for example, a support vector machine (SVM), a convolutional neural network (CNN), or a recurrent neural network (RNN)). For example, the classification model may be a linear model such as a linear function, or may be a non-linear model such as a neural network model, or may be a combination of different types of models. This is not limited in this application.

Using the SVM as an example, the SVM is a common supervised learning classification method. In an embodiment, sentiment polarity labeling is first performed on an obtained training sample through manual labeling, and then mapping from a training sample to a sentiment polarity is trained using a supervised machine learning model. After the training sample is received, a parameter in the classification model is optimized using a polarity characteristic vector of the training sample and a known sentiment polarity.

In other phrases, the polarity characteristic vector of each phrase and the sentiment polarity of each phrase may be used as inputs, to optimize each parameter in the classification model.

It should be understood that, the above described process of training the classification model through supervised machine learning can be implemented using a method in other approaches, and for brevity, detailed descriptions of the specific process are omitted herein. It should be further understood that, the SVM, the CNN, and the RNN are merely possible implementations in the supervised machine learning algorithm, and shall not constitute any limitation on this application. A specific machine learning method is not limited in this application.

In this embodiment of this application, the classifier training process may be an iterative update process. After obtaining any corpus and determining a sentiment polarity of the corpus, the classifier training apparatus may train the classifier once again based on the newly obtained corpus, to update the polarity characteristic information of the word, update the polarity characteristic vector of the phrase, and optimize the parameter in the classification model. In this case, the classifier training apparatus and the natural language processing apparatus in the method 200 may be a same apparatus, or may be two apparatuses communicatively connected. This is not limited in this application.

Optionally, the method 300 further includes adding, into the dictionary, the processed phrase determined by the classifier, and using the processed phrase as a training sample to train the classifier.

Specifically, the phrase determined by the classifier may be the to-be-processed phrase in the method 200, and after steps 210 to 240 in the method 200 are performed, the sentiment polarity of the to-be-processed phrase can be obtained. The to-be-processed phrase is used as the processed phrase and added into the dictionary, to update the sentiment dictionary, that is, to update the training sample. Further, the classifier is trained based on the updated training sample, to update the classifier.

It should be understood that, the training process of the classifier has been described in detail above with reference to steps 3201 to 3203, and for brevity, details are not described herein again.

Therefore, in this embodiment of this application, an existing sentiment dictionary is used as a training sample, and the classifier is trained based on a connection between a word and a phrase. In the method in which the dictionary is used as the training sample, massive estimation is not needed, and the trained classifier can highly accurately determine a sentiment polarity of a phrase. In addition, after being determined, a newborn sentiment phrase is added into the sentiment dictionary such that the dictionary can be automatically extended, that is, training samples are automatically extended, and the training samples are extended in an iterative update manner, finally, a classification model is built based on the extended training samples. This can improve accuracy of determining a sentiment polarity of the newborn sentiment phrase by the classifier and eliminate a manual labeling process. In addition, in this method, no manual design rule is required, and no language professionals need to participate in training. This facilitates implementation.

The foregoing describes in detail the method provided in the embodiments of this application with reference to FIG. 2 and FIG. 3. The following describes in detail an apparatus provided in the embodiments of this application with reference to FIG. 4 to FIG. 7.

Figure 4:
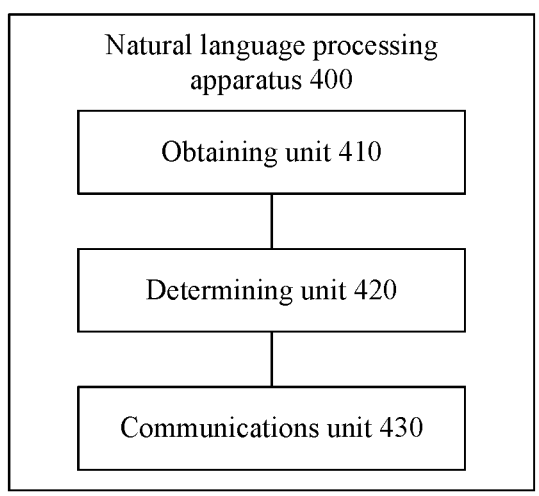
FIG. 4 is a schematic block diagram of a natural language processing apparatus according to an embodiment of this application.

FIG. 4 is a schematic block diagram of a natural language processing apparatus 400 according to an embodiment of this application. As shown in FIG. 4, the natural language processing apparatus 400 includes an obtaining unit 410, a determining unit 420, and a communications unit 430.

The obtaining unit 410 is configured to obtain a to-be-processed phrase. The to-be-processed phrase includes M words.

The determining unit 420 is configured to determine polarity characteristic information of m to-be-processed words in the M words. Polarity characteristic information of an $i^{th}$ word in the m to-be-processed words includes n polarity characteristic values. A $j^{th}$ polarity characteristic value of the $i^{th}$ word is determined based on a percentage of a quantity of target phrases in a prestored dictionary in a quantity of all phrases including the $i^{th}$ word in the prestored dictionary. The target phrase is a phrase having a sentiment polarity corresponding to the $j^{th}$ polarity characteristic value, in all the phrases including the $i^{th}$ word.

The determining unit 420 is further configured to determine a polarity characteristic vector of the to-be-processed phrase based on the polarity characteristic information of the m to-be-processed words. The polarity characteristic vector includes n groups of components in a one-to-one correspondence with n sentiment polarities. A $j^{th}$ group of components in the n groups of components are determined based on a $j^{th}$ polarity characteristic value of each of the m to-be-processed words.

The determining unit 420 is further configured to determine a sentiment polarity of the to-be-processed phrase based on the polarity characteristic vector of the to-be-processed phrase using a preset classifier. The classifier is configured to determine the sentiment polarity of the to-be-processed phrase.

The communications unit 430 is configured to output the sentiment polarity of the to-be-processed phrase.

M, n, m, i, and j are all positive integers, M≥m, i is any value in [1,m], and j is any value in [1,n].

It should be understood that, the natural language processing apparatus 400 may be corresponding to the natural language processing apparatus in the natural language processing method 200 according to the embodiments of this application. The natural language processing apparatus 400 may include modules configured to perform the method performed by the natural language processing apparatus in the natural language processing method 200 in FIG. 2. In addition, the modules in the natural language processing apparatus 400 and the foregoing other operations and/or functions are intended to implement corresponding procedures of the natural language processing method 200 in FIG. 2. Specifically, the obtaining unit 410 is configured to perform step 210 in the method 200, the determining unit 420 is configured to perform steps 220 to 240 in the method 200, and the communications unit 430 is configured to perform step 250 in the method 200. Specific processes of performing the foregoing corresponding steps by the units have been described in detail in the method 200, and for brevity, details are not described herein again.

Figure 5:
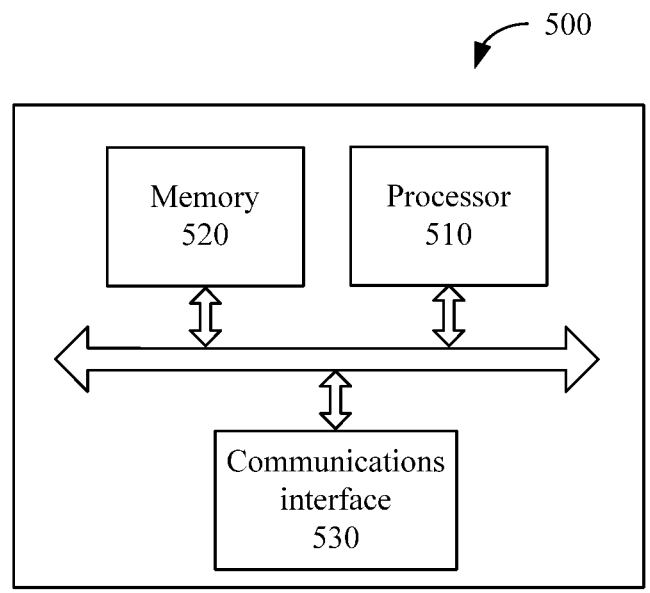
FIG. 5 is a schematic structural diagram of a natural language processing apparatus according to an embodiment of this application.

FIG. 5 is a schematic structural diagram of a natural language processing apparatus 500 according to an embodiment of this application. As shown in FIG. 5, the natural language processing apparatus 500 includes a processor 510, a memory 520, and a communications interface 530. The memory 520 stores an instruction. The processor 510 is configured to execute the instruction in the memory 520. When the instruction is executed, the processor 510 is configured to perform the method provided in the foregoing method embodiments. The processor 510 is further configured to control the communications interface 530 to communicate with the outside world.

Specifically, the natural language processing apparatus 500 may be corresponding to the natural language processing apparatus in the natural language processing method 200 according to the embodiments of this application. The natural language processing apparatus 500 may include modules configured to perform the method performed by the natural language processing apparatus in the natural language processing method 200 in FIG. 2. In addition, the modules in the natural language processing apparatus 500 and the foregoing other operations and/or functions are intended to implement corresponding procedures of the natural language processing method 200 in FIG. 2. Specific processes of performing the foregoing corresponding steps by the modules have been described in detail in the method 200, and for brevity, details are not described herein again.

Figure 6:
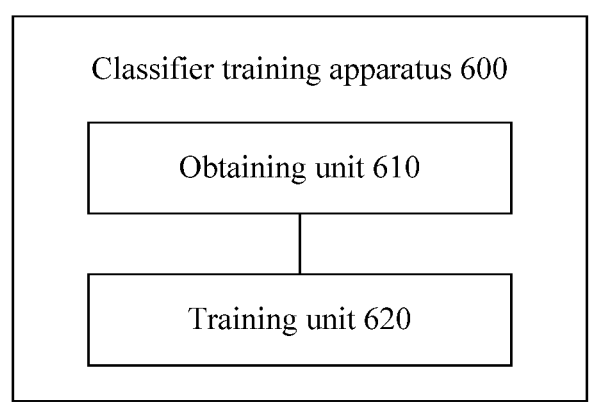
FIG. 6 is a schematic block diagram of a classifier training apparatus according to an embodiment of this application.

FIG. 6 is a schematic block diagram of a classifier training apparatus 600 according to an embodiment of this application. As shown in FIG. 6, the classifier training apparatus 600 includes an obtaining unit 610 and a training unit 620.

It should be understood that, the classifier training apparatus 600 may be corresponding to the classifier training apparatus in the classifier training method 300 according to the embodiments of this application. The classifier training apparatus 600 may include modules configured to perform the method performed by the classifier training apparatus in the classifier training method 300 in FIG. 3. In addition, the modules in the classifier training apparatus 600 and the foregoing other operations and/or functions are intended to implement corresponding procedures of the classifier training method 300 in FIG. 3. Specifically, the obtaining unit 610 is configured to perform step 310 in the method 300, and the training unit 620 is configured to perform step 320 in the method 300. Specific processes of performing the foregoing corresponding steps by the units have been described in detail in the method 300, and for brevity, details are not described herein again.

Figure 7:
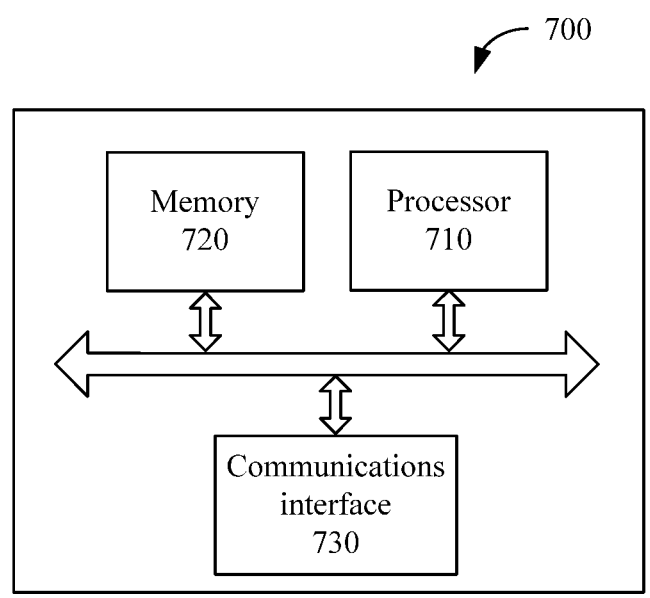
FIG. 7 is a schematic structural diagram of a classifier training apparatus according to an embodiment of this application.

FIG. 7 is a schematic structural diagram of a classifier training apparatus 700 according to an embodiment of this application. As shown in FIG. 7, the classifier training apparatus 700 includes a processor 710, a memory 720, and a communications interface 730. The memory 720 stores an instruction. The processor 710 is configured to execute the instruction in the memory 720. When the instruction is executed, the processor 710 is configured to perform the method provided in the foregoing method embodiments. The processor 710 is further configured to control the communications interface 730 to communicate with the outside world.

Specifically, the classifier training apparatus 700 may be corresponding to the classifier training apparatus in the classifier training method 300 according to the embodiments of this application. The classifier training apparatus 700 may include modules configured to perform the method performed by the classifier training apparatus in the classifier training method 300 in FIG. 3. In addition, the modules in the classifier training apparatus 700 and the foregoing other operations and/or functions are intended to implement corresponding procedures of the classifier training method 300 in FIG. 3. Specific processes of performing the foregoing corresponding steps by the modules have been described in detail in method 300, and for brevity, details are not described herein again.

An embodiment of this application further provides a computer-readable storage medium. The computer-readable storage medium includes a computer program. When the computer program runs on a computer, the computer is enabled to perform the method provided in the foregoing method embodiments.

An embodiment of this application further provides a computer program product including an instruction. When the computer program product runs on a computer, the computer is enabled to perform the method provided in the foregoing method embodiments.

It should be understood that, the processor in the embodiments of this application may be a central processing unit (CPU), or may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

It may be further understood that, the memory in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random-access memory (RAM) used as an external cache. By way of example but not limitative description, many forms of RAM may be used, for example, a static random access memory (SRAM), a dynamic rando-access memory (DRAM), a synchronous dynamic random-access memory (SDRAM), a double data rate synchronous dynamic random-access memory (DDR SDRAM), an enhanced synchronous dynamic random-access memory (ESDRAM), a synchronous link dynamic random-access memory (SLDRAM), and a direct Rambus dynamic random access memory (DRDRAM).

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a specific working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The software product is stored in a storage medium, and includes one or more instructions for instructing a computer device (which may be a personal computer, a server, a network device, or the like) to perform all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A natural language processing method, comprising:
    obtaining a single to-be-processed phrase that comprises M words;
    determining first respective polarity characteristic information for each respective word of first to-be-processed words in the M words, wherein, for each respective word of the first to-be-processed words, the first respective polarity characteristic information comprises a first respective plurality of n polarity characteristic values, wherein, for each respective word of the first to-be-processed words, each respective polarity characteristic value of the first respective plurality of n polarity characteristic values corresponds to a respective sentiment polarity of n sentiment polarities and is determined at least in part by:
        determining, from all of one or more second phrases that are in a preset dictionary and that comprise the respective word, a first quantity of one or more first phrases that correspond to the respective sentiment polarity; and
        determining, using the first quantity, a first respective percentage of the one or more second phrases that correspond to the one or more first phrases;
    determining, based on the first respective polarity characteristic information of the first to-be-processed words, a first polarity characteristic vector of the single to-be-processed phrase, wherein the first polarity characteristic vector comprises first n respective groups, wherein each respective group of the first n respective groups comprises a first respective plurality of m components, wherein the first n respective groups are in a one-to-one correspondence with the n sentiment polarities, and wherein each respective group of the first n respective groups corresponds to a respective sentiment polarity of the n sentiment polarities and is determined based on a first respective subset of polarity characteristic values of the first respective plurality of n polarity characteristic values of the first to-be-processed words that correspond to the respective sentiment polarity;
    determining, using a preset classifier and based on the first polarity characteristic vector, a first sentiment polarity of the single to-be-processed phrase; and
    outputting the first sentiment polarity of the single to-be-processed phrase, wherein M, m, and n are positive integers, and wherein M≥m.

2. The natural language processing method of claim 1, wherein when m>1, determining the first polarity characteristic vector comprises combining the first respective plurality of n polarity characteristic values in the first respective polarity characteristic information of the first to-be-processed words into the first polarity characteristic vector, and wherein a first group of components in the n groups comprises m polarity characteristic values that are obtained by combining first polarity characteristic values of the first respective plurality of n polarity characteristic values.

3. The natural language processing method of claim 2, wherein when M>m, a greatest value of each of the first respective plurality of n polarity characteristic values is greater than any polarity characteristic value of any one of remaining (M−m) words.

4. The natural language processing method of claim 2, wherein combining the first respective plurality of n polarity characteristic values comprises combining the first respective plurality of n polarity characteristic values into the first polarity characteristic vector according to an arrangement order of the first to-be-processed words.

5. The natural language processing method of claim 1, wherein when m>1, determining the first polarity characteristic vector comprises:
    traversing the range [1,n] for x, wherein x is a positive integer; and
    determining an $x^{th}$ group of components in the first n respective groups in any one of the following manners:
        finding an average of $x^{th}$ polarity characteristic values of all of the first to-be-processed words;
        finding a sum of the $x^{th}$ polarity characteristic values; or
        finding a greatest value of the $x^{th}$ polarity characteristic values.

6. The natural language processing method of claim 1, further comprising:
    treating the single to-be-processed phrase as a first processed phrase; and
    adding the first processed phrase into the preset dictionary.

7. The natural language processing method of claim 1, further comprising:
    obtaining a training sample from the preset dictionary, wherein the training sample comprises Y phrases with the n sentiment polarities, and wherein each phrase of the Y phrases comprises second to-be-processed words;
    training the preset classifier using the training sample;
    determining second respective polarity characteristic information of each word of third to-be-processed words, of the second to-be-processed words, comprised in a second phrase of the Y phrases, wherein corresponding polarity characteristic information of respective words in the second to-be-processed words comprises a second plurality of n polarity characteristic values, wherein, for each respective word in the second to-be-processed words, the second plurality of n polarity characteristic values corresponds to a respective sentiment priority of the n sentiment priorities and is determined at least in part by:

determining, from all of one or more fourth phrases that are in the preset dictionary and that comprise the respective word, a second quantity of one or more third phrases that correspond to the respective sentiment polarity; and determining, using the second quantity, a second respective percentage of the one or more fourth phrases that correspond to the one or more third phrases;

determining a second polarity characteristic vector of the second phrase based on the second respective polarity characteristic information of the third to-be-processed words, wherein the second polarity characteristic vector comprises second n groups of a second respective plurality of m components in a one-to-one correspondence with the n sentiment polarities, and wherein each respective group of the second n respective groups corresponds to a respective sentiment polarity of the n sentiment polarities and is determined based on a second respective subset of polarity characteristic values of the second respective plurality of n polarity characteristic values of the second to-be-processed words that correspond to the respective sentiment polarity; and training the preset classifier using a second sentiment polarity of the second phrase and the second polarity characteristic vector, wherein Y is a positive integer.

8. The natural language processing method of claim 7, further comprising:

treating the second to-be-processed phrase as a second processed phrase, and training the preset classifier with the second processed phrase as the training sample.

9. A natural language processing apparatus, comprising:

a processor; and a memory coupled to the processor and storing instructions that, when executed by the processor, cause the natural language processing apparatus to be configured to:

obtain a single to-be-processed phrase that comprises M words;

determine first respective polarity characteristic information for each respective word of first to-be-processed words in the M words, wherein, for each respective word of the first to-be-processed words, the first respective polarity characteristic information comprises a first respective plurality of n polarity characteristic values, wherein, for each respective word of the first to-be-processed words, each respective polarity characteristic value of the first respective plurality of n polarity characteristic values corresponds to a respective sentiment polarity of n sentiment polarities and is determined at least in part by:

determining, from all of one or more second phrases that are in a preset dictionary and that comprise the respective word, a first quantity of one or more first phrases that correspond to the respective sentiment polarity; and determining, using the first quantity, a first respective percentage of the one or more second phrases that correspond to the one or more first phrases;

determine, based on the first respective polarity characteristic information of the first to-be-processed words, a first polarity characteristic vector of the single to-be-processed phrase, wherein the first polarity characteristic vector comprises first n respective groups, wherein each respective group of the first n respective groups comprises a first respective plurality of m components, wherein the first n respective groups are in a one-to-one correspondence with the n sentiment polarities, and wherein each respective group of the first n respective groups corresponds to a respective sentiment polarity of the n sentiment polarities and is determined based on a first respective subset of polarity characteristic values of the first respective plurality of n polarity characteristic values of the first to-be-processed words that correspond to the respective sentiment polarity;

determine, using a preset classifier and based on the first polarity characteristic vector, a first sentiment polarity of the single to-be-processed phrase; and output the first sentiment polarity of the single to-be-processed phrase, wherein M, m, and n are positive integers.

10. The natural language processing apparatus of claim 9, wherein when m>1, the instructions further cause the natural language processing apparatus to be configured to combine the first respective plurality of n polarity characteristic values in the first respective polarity characteristic information of the first to-be-processed words into the first polarity characteristic vector, and wherein a first group of components in the n groups comprises m polarity characteristic values that are obtained by combining first polarity characteristic values of the first respective plurality of n polarity characteristic values.

11. The natural language processing apparatus of claim 10, wherein when M>m, a greatest value of each of the first respective plurality of n polarity characteristic values is greater than any polarity characteristic value of any one of remaining (M−m) words.

12. The natural language processing apparatus of claim 10, wherein the instructions further cause the natural language processing apparatus to be configured to combine the first respective plurality of n polarity characteristic values into the first polarity characteristic vector according to an arrangement order of the first to-be-processed words.

13. The natural language processing apparatus of claim 9, wherein when M>1, the instructions further cause the natural language processing apparatus to be configured to:

traverse the range [1,n] for x, wherein x is a positive integer; and determine an $x^{th}$ group of components in the first n respective groups of components by:

finding an average of $x^{th}$ polarity characteristic values of all of the first to-be-processed words;

finding a sum of the $x^{th}$ polarity characteristic values; or finding a greatest value of the $x^{th}$ polarity characteristic values.

14. The natural language processing apparatus of claim 9, wherein the instructions further cause the natural language processing apparatus to be configured to:

treat the first to-be-processed phrase as a first processed phrase; and add the first processed phrase into the preset dictionary.

15. The natural language processing apparatus of claim 9, wherein the instructions further cause the natural language processing apparatus to be configured to:

obtain a training sample from the preset dictionary, wherein the training sample comprises Y phrases with the n sentiment polarities, and wherein each phrase of the Y phrases comprises second to-be-processed words;

train the preset classifier using the training sample;

determine second respective polarity characteristic information of each word of third to-be-processed words, of the second to-be-processed words, comprised in a second phrase of the Y phrases, wherein corresponding polarity characteristic information of respective words in the second to-be-processed words comprises a second plurality of n polarity characteristic values, wherein, for each respective word in the second to-be-processed words, the second plurality of n polarity characteristic values corresponds to a respective sentiment priority of the n sentiment priorities and is determined at least in part by:
  determine from all of one or more fourth phrases that are in the preset dictionary and that comprise the respective word, a second quantity of one or more third phrases that correspond to the respective sentiment polarity; and
  determine, using the second quantity, a second respective percentage of the one or more fourth phrases that correspond to the one or more third phrases;
determine a second polarity characteristic vector of the second phrase based on the second respective polarity characteristic information of the third to-be-processed words, wherein the second polarity characteristic vector comprises second n groups of a second respective plurality of m components in a one-to-one correspondence with the n sentiment polarities, and wherein each respective group of the second n respective groups corresponds to a respective sentiment polarity of the n sentiment polarities and is determined based on a second respective subset of polarity characteristic values of the second respective plurality of n polarity characteristic values of the second to-be-processed words that correspond to the respective sentiment polarity; and
train the preset classifier using a second sentiment polarity of the second phrase and the second polarity characteristic vector, wherein Y is a positive integer.

16. The natural language processing apparatus of claim 15, wherein the instructions further cause the natural language processing apparatus to be configured to:
  treat the second to-be-processed phrase as a second processed phrase; and
  train the preset classifier using the second processed phrase as the training sample.

17. A computer program product comprising computer-executable instructions that are stored on a non-transitory computer-readable medium and that, when executed by a processor, cause a computer to:
  obtain a single to-be-processed phrase that comprises M words;
  determine first respective polarity characteristic information for each respective word of first to-be-processed words in the M words, wherein, for each respective word of the first to-be-processed words, the first respective polarity characteristic information comprises a first respective plurality of n polarity characteristic values, wherein, for each respective word of the first to-be-processed words, each first respective polarity characteristic value of the first respective plurality of n polarity characteristic values corresponds to a first respective sentiment polarity of n sentiment polarities and is determined at least in part by:
    determining, from all of one or more second phrases that are in a preset dictionary and that comprise the respective word, a first quantity of one or more first phrases that correspond to the respective sentiment polarity; and
    determining, using the first quantity, a respective percentage of the one or more second phrases that correspond to the one or more first phrases;
  determine, based on the first respective polarity characteristic information of the first to-be-processed words, a first polarity characteristic vector of the single to-be-processed phrase, wherein the first polarity characteristic vector comprises first n respective groups, wherein each respective group of the first n respective groups comprises a first respective plurality of m components, wherein the first n respective groups are in a one-to-one correspondence with the n sentiment polarities, and wherein each respective group of the first n respective groups corresponds to a respective sentiment polarity of the first plurality of n sentiment polarities and is determined based on a first respective subset of polarity characteristic values of the first respective plurality of n polarity characteristic values of the first to-be-processed words that correspond to the respective sentiment polarity;
  determine, using a preset classifier and based on the first polarity characteristic vector, a first sentiment polarity of the single to-be-processed phrase; and
  output the first sentiment polarity of the single to-be-processed phrase, wherein M, m, and n are positive integers.

18. The computer program product of claim 17, wherein when m>1, the instructions further cause the computer to be configured to combine the first respective plurality of n polarity characteristic values in the first respective polarity characteristic information of the first to-be-processed words into the first polarity characteristic vector, and wherein a first group of components in the n groups comprises m polarity characteristic values that are obtained by combining first polarity characteristic values of the first respective plurality of n polarity characteristic values.

19. The computer program product of claim 18, wherein when M>m, a greatest value of each of the first respective plurality of n polarity characteristic values is greater than any polarity characteristic value of any one of remaining (M−m) words.

20. The computer program product of claim 18, wherein the instructions further cause the computer to combine the first respective plurality of n polarity characteristic values into the first polarity characteristic vector according to an arrangement order of the first to-be-processed words.

* * * * *